United States Patent [19]

Williamson, IV

[11] Patent Number: 4,965,846
[45] Date of Patent: Oct. 23, 1990

[54] PIVOT PIN BEARING/SEAL WITH LOOSE EYELET ESPECIALLY SUITED FOR DISPOSABLE CONTINUOUS FLOW BLOOD FILTRATION SYSTEM CARTRIDGES

[75] Inventor: Warren P. Williamson, IV, Huntington Beach, Calif.

[73] Assignee: Baxter International Inc., Deerfield, Ill.

[21] Appl. No.: 262,259

[22] Filed: Oct. 20, 1988

Related U.S. Application Data

[63] Continuation of Ser. No. 129,879, Dec. 4, 1987, abandoned, which is a continuation of Ser. No. 895,381, Aug. 11, 1986, abandoned.

[51] Int. Cl.⁵ .............................................. F16C 33/74
[52] U.S. Cl. ..................................... 384/138; 384/140
[58] Field of Search ............... 384/138, 482, 485, 140, 384/147, 139, 479

[56] References Cited

U.S. PATENT DOCUMENTS

| | | | |
|---|---|---|---|
| 3,377,820 | 4/1968 | Smith | 384/485 |
| 3,448,858 | 6/1969 | Delcellier et al. | |
| 3,519,201 | 7/1970 | Eisel et al. | |
| 3,709,572 | 1/1973 | Pethis | 384/482 |
| 3,797,899 | 3/1974 | Anderson | 384/485 |
| 4,303,193 | 12/1981 | Latham | |
| 4,521,366 | 6/1985 | Mason et al. | |
| 4,538,822 | 9/1985 | Beacom | 277/207 A |
| 4,675,106 | 6/1987 | Schoendorfer et al. | |

Primary Examiner—Lenard A. Footland
Attorney, Agent, or Firm—Paul C. Flattery; Bradford R. L. Price; Larry S. Nixon

[57] ABSTRACT

A pivot pin bearing/seal especially adapted for supporting the rotor of a disposable filtration cartridge of a continuous-flow plasmapheresis blood separation system includes a lubricious plastic pivot pin injection molded with a recess at its end. The recess is surrounded by a sharp circular inside edge. A stainless steel eyelet, deep drawn from successive dies, is loosely inserted into the pin recess, a radial outer surface defined at the junction between the eyelet shank and the eyelet flange contacting the pin sharp edge. The eyelet rotates relative to the pin, the circular line path of rotational contact being defined by the smooth curved surface under the flange of the eyelet and the sharp inside edge surrounding the pin recess which quickly burnishes to a good rotational seal. A silicon elastomer seal ring is disposed between the eyelet flange and the rotating filtration rotor to establish a fluid-tight essentially non-rotating seal between the eyelet and the rotor (and therefore causing the eyelet to rotate with the rotor relative to the pin). Coaxial sealing structures may be provided in cascade-type filter cartridges.

36 Claims, 5 Drawing Sheets

PIVOT PIN BEARING/SEAL WITH LOOSE EYELET ESPECIALLY SUITED FOR DISPOSABLE CONTINUOUS FLOW BLOOD FILTRATION SYSTEM CARTRIDGES

This is a continuation of application Ser. No. 07/129,879, filed Dec. 4, 1987, now abandoned, which is a continuation of application Ser. No. 06/895,381 filed Aug. 11, 1986, now abandoned.

CROSS REFERENCES TO RELATED APPLICATIONS

This application is related to copending, commonly-assigned application Ser. No. 722,707, filed Apr. 12, 1985, entitled "Pivot Pin Bearing for Biomedical Systems", now U.S. Pat. No. 4,675,106, the disclosure of which is expressly incorporated herein by reference.

FIELD OF THE INVENTION

This invention relates most directly to biomedical fluid filtration techniques, and more particularly, to continuous-flow blood filtration systems of the type including a disposable plasmapheresis filter cartridge having a rotor rotatably supported by a pivot bearing/seal. The resulting pivot pin bearing/seal with loose eyelet may also find application in other fields.

BACKGROUND OF THE INVENTION

Much research and development effort has been devoted to perfecting new and better techniques for filtering biological fluids and for separating the constituent parts of such fluids. Especially important are techniques for separating whole blood into its constituent elements ("hemapheresis"). Although most hemapheresis has been performed in the past by centrifuging batches of whole blood, batch processing is very expensive and time-consuming. Batch processing is now being replaced, wherever possible, by more efficient, continuous-flow blood filtration techniques. See, for example, application Ser. No. 449,470, filed Dec. 13, 1982, entitled "Blood Fractionation System and Method"; application Ser. No. 591,925, filed Mar. 21, 1984, entitled "Method and Apparatus for Separation of Matter from Suspension", abandoned,; U.S. Pat. No. 3,519,201, entitled "Seal Means for Blood Separator and the Like" issued in 1970 to Eisel et al; and U.S. Pat. No. 4,303,193 to Latham, Jr. entitled "Apparatus for Separating Blood into Components Thereof".

Continuous-flow blood filtration systems receive a flow of whole blood from a subject, and couple this blood flow to a rotating rotor or spinner rotatably disposed within a fluid-tight housing. The spinning rotor separates the whole blood into its component parts (e.g., in plasmapheresis, the whole blood is separated into packed red blood cells and plasma), and the separated component parts are discharged through different outlets of the housing.

Others have sought to develop reliable pivot bearing arrangements for rotatably supporting the rotor of a fluid filtration system within a housing — see, for example, U.S. Pat. No. 3,448,858 to Delcellier et al for an example of one such pivot bearing arrangement. Those developing continuous-flow plasmapheresis devices for commercial production have searched for a suitable inexpensive and reliable pivot pin bearing which can rotatably support a separation rotor within a housing and couple fluid flow to/from the rotor — and also prevent the coupled fluid flow from escaping from the bearing (except through a fluid discharge outlet) while isolating the coupled fluid flow from fluid outside of the bearing.

Sterility is an absolute requirement in continuous-flow type plasmapheresis devices. It is desirable (if not essential) that parts of the plasmapheresis system which are actually exposed to blood flow be disposable so that disease will not be spread from one donor to another. Known sealing pivot pin bearings which reliably rotatably support the separation rotor within a housing and also couple fluid flow to/from the rotating rotor are relatively expensive to manufacture, increasing the cost of disposable continuous-flow plasmapheresis filtration cartridges.

Because the filtration cartridges are discarded after only one use, extended bearing life is not a concern. Only 25–45 minutes of continuous operation is required for plasmapheresis (the filtration cartridge should have a life of 2 hours if used for plateletapheresis, a life of 4 hours if used for certain therapeutic procedures, and a life of up to 6 hours if used for autotransfusion). The pivot pin bearing must perform absolutely reliably throughout its expected life, since premature excessive wear can make the extracted blood unusable and/or interrupt the extraction and filtration process. The sealing pivot pin bearings used in filtration cartridges must also be sterilizable (e.g., by exposure to gamma radiation), and cannot damage the biological fluid flowing through them.

The assignee of the subject application has searched for years for a reliable, inexpensive bearing structure meeting the above requirements for use in its continuous-flow blood filtration system (of the type disclosed in, for example, U.S. Patent Application Ser. No. 591,925 of Schoendorfer). A brief description of that blood filtration system and the stainless steel pivot pin bearings previously used will now be presented in conjunction with FIG. 1 (although a much more detailed discussion of that system may be found in the above-cited, commonly-assigned U.S. patent application).

Figure 1:
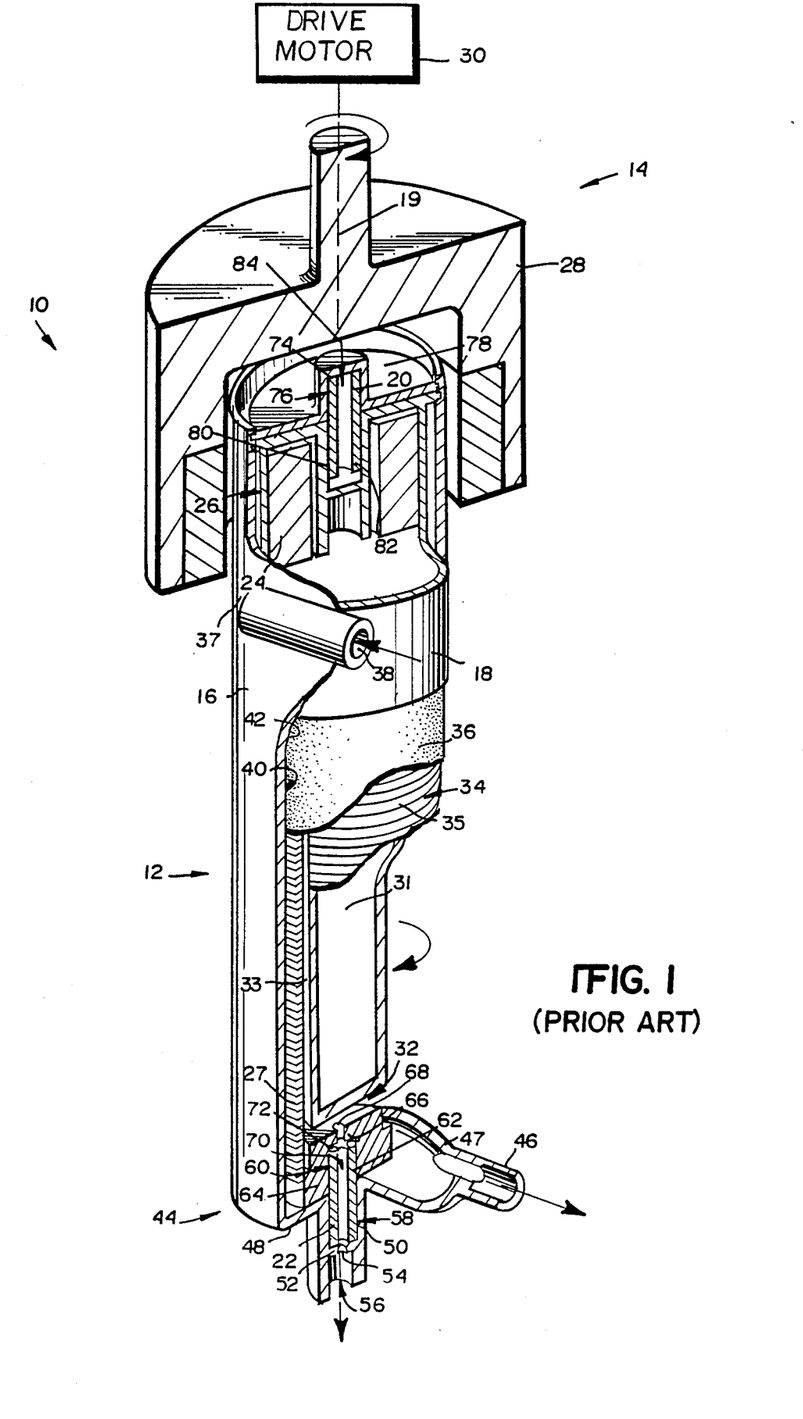
FIG. 1 is an elevated, perspective view in partial cross-section of a prior art continuous-flow plasmapheresis system including a disposable blood filtration cartridge.

FIG. 1 is an elevated, perspective view in partial cross-section of a prior art filtration-type plasmapheresis system 10. Plasmapheresis system 10 includes a disposable filtration cartridge 12 and a magnetic driving assembly 14.

Cartridge 12 includes a generally cylindrical, vertically-oriented housing 16 within which an elongated cylindrical rotor ("spinner") 18 is rotatably supported in a vertical orientation between an upper pivot bearing 20 and a lower pivot bearing 22. Rotor 18 rotates within housing 16 about a generally vertical axis 19 of rotation axial to the rotor.

A ring 24 of magnetic material integral to the upper vertical end 26 of rotor 18 is acted upon by a rotating magnetic field generated by external, rotating magnetic drive member 28 (which slides over the housing upper end), causing rotor 18 to rotate relative to housing 16. Magnetic drive member 28 rotates at a predetermined angular velocity (3600 rpm in the preferred embodiment) in response to torque applied to it by a drive motor 30.

Rotor 18 has an internal cavity 31 within it bounded by a grooved cylindrical wall 34. A membrane-type filter 36 covers the outer surface 35 of grooved wall 34. A network of channels 33 formed in the outer wall surface 35 channels fluid trapped between the filter 36 and the outer wall surface into a lower cavity 32 at the rotor lower end 27.

When system 10 is operating, whole blood is delivered to an upper end 37 of housing 16 via a whole blood inlet port 38. The whole blood flows from inlet port 38 into housing 16 and downward into contact with filter 36. Due to the rotation of rotor 18 and the effect of filter 36, whole blood in the space 40 between filter 36 and an inner wall 42 of housing 16 is separated into packed red blood cells (which remain in space 40), and plasma (which flows through filter 36 into a space between grooved wall 34 and the filter). The packed red blood cells continue to flow downward to the lower end 44 of housing 16 and flow out of the housing through a packed blood cell outlet 46. The plasma is channelled by the grooves in rotor wall 34 and channels 33 and flows downward into lower cavity 32.

A lower cap 48 terminating the lower end 44 of housing 16 defines a bore 50 of predetermined length aligned with the axis 19 of rotor rotation. Bore 50 terminates in a circular interior wall (annulus) 52 having a circular orifice 54 defined through its center (terminating interior annulus 52 blocks all but the center of bore 50).

A plasma outlet 56 is defined in lower cap 48 (in communication with bore 50 at the other side of annulus 52). Plasma is discharged from housing 16 through plasma outlet 56. The lower end 58 of lower pivot pin 22 (the pivot pin being vertically oriented in the embodiment shown) is press-fitted into bore 50 and abuts obstructing annulus 52. The upper end 60 of lower pivot pin 22 is rotatably disposed within a bore 62 at the rotor lower end 64 and aligned with the axis 19 of rotor rotation. Rotor 18 spins with respect to lower pivot pin 22 and is supported above and spaced away from housing lower cap 48 by this pin.

Axial bore 62 defined at the rotor lower end 64 terminates in a ridge or annulus 66 having an orifice 68 defined therethrough. Orifice 68 is in fluid communication with rotor cavity 32. A fluid passageway 70 is defined axially through lower pivot pin 22. An O-ring or other resilient seal 72 (Viton elastomer is preferably used) is disposed between annulus 66 and the upper end 60 of lower pivot pin 22. Seal 72 defines a hole centrally therethrough which communicates orifice 68 with passageway 70. Cavity 32 is thus in fluid communication with plasma outlet 56 via orifice 68, the hole through O-ring 72, passageway 70 defined axially through lower pivot pin 22, and orifice 54.

Lower pivot bearing 22 rotatably supports rotor 18 and provides a sealed fluid passageway through which the plasma within rotor cavity 32 can escape. The lower pivot pin upper end is loosely fitted into bore 62 to permit rotor 18 to rotate relative to the pin—the pin being fixed with respect to housing 16 because it is press-fitted into bore 50. O-ring 72 establishes a fluid-tight seal between annulus 66 and the upper end 60 of lower pivot pin 22 which prevents plasma from escaping from cavity 32 except through pin passageway 70. The fluid-tight seal between annulus 66, O-ring 72 and the pin upper end 60 also prevents packed red blood cells collected in space 40 near the housing lower end 44 from flowing upward into bore 62 (between pin 22 and the wall defining the bore) and into contact with the plasma.

The axial downward force exerted on O-ring 72 by rotor 18 insures that a fluid-tight seal exists between annulus 66 of rotor 18, O-ring 72 and the upper end 60 of lower pin 22. This downward force is derived in part from the force of gravity exerted on rotor 18 and in part from the downward component of the rotating magnetic field exerted on the rotor by magnetic drive member 28. Despite this downward force, pin upper end 60 does not wear appreciably over the life of cartridge 12 if the pin is made of hard stainless steel.

Upper pivot pin 20 may be solid (since no fluid passes through it in the embodiment shown), but preferably has a passageway 84 axially defined therethrough so that the upper pivot pin and lower pivot pin 22 can have the same structure—and are thus interchangeable (to reduce manufacturing, inventory and assembly costs). An O-ring and orifices could be provided at the upper end 26 of rotor 18 (as they are provided at the lower end 64 of the rotor) if fluid coupling through upper pin 20 is desired.

As will now be understood, the fluid-tight seal between annulus 66 of rotor 18 and upper end 60 of lower pivot pin 22 is absolutely critical to the proper operation of system 10. The downward axial force applied to O-ring 72 by rotor 18 can cause the O-ring and/or the upper end 60 of pin 22 to wear, in turn causing the fluid-tight seal to degenerate, if the pin is made of improper material. Leakage of this seal can make the plasma 56 discharged from outlet 56 unusable. Moreover, wear of pin upper end 60 can close passageway 70, interrupting the entire filtration operation (to the distress and discomfort of the donor).

The assignee of the subject invention has used precision stainless steel pins 22 and Viton O-rings 72 in the past to provide pivot pin bearings with great wear resistance which overcome problems caused by wear. Unfortunately, precision stainless steel pins are expensive to manufacture and Viton material is also very expensive—substantially increasing the cost of cartridge 12.

The fabrication of these prior art precision stainless steel pivot pins 20, 22 are described in detail in copending commonly-assigned application Ser. No. 722,707. Initial raw material costs for stainless steel pins are relatively high, and machining, polishing, cleaning and other treatment of the stainless steel to produce a finished pin further increases installed cost. Moreover, a large percentage of completed pins are unacceptable for use because of the very close dimensional tolerances necessary to guarantee proper mating of the pins with rotor 18 and housing 16.

Application Ser. No. 722,797 of Schoendorfer and Williamson, now U.S. Pat. No. 4,675,106, discloses a novel injection-molded plastic pivot bearing design suitable for replacing precision stainless steel pivot pins. Such injection-molded pivot pins are formed from a hard plastic having a low coefficient of friction. By choosing an appropriate plastic material for the pin (e.g., nylon 6/6 and RL 4730 polyamide-based polymer modified with PTFE and silicon), the pin has a lubricious wear-resistant characteristic and will not create "hot spots" on relative rotating parts or shed debris. When used in conjunction with an O-ring seal fabricated of a Viton material (a series of fluoroelastomers based on the copolymer of vinylidene fluoride and hexafluoropropylene marketed by Dupont), the force applied by rotor 18 on the lower plastic pin and O-ring together provides adequate fluid-tight sealing.

Such a fluid-tight seal lasts long enough to permit the separation and collection of a required amount of plasma. Because cartridge 12 is discarded after one use, self-destruction of the pivot pin bearing due to wear from a few hours of continuous rotation of rotor 18 is of no consequence in blood filtration applications.

Although the pivot pin bearing design described in copending application Ser. No. 722,707, (now U.S. Pat. No. 4,675,106) is successful in its own right and works well for its intended purpose, the Viton seal this design uses is very expensive, and its components must be closely inspected for use in blood filtration applications. It would be highly desirable to provide a low-cost injection molded plastic pivot pin bearing structure which exhibits acceptable wear, is more tolerant of elastomer formulations for the seal ring, and is inexpensive and relatively easy to fabricate to the precise dimensional tolerances required in a disposable plasmapheresis filtration cartridge.

SUMMARY OF THE INVENTION

The present invention provides a pivot bearing especially suited for use in disposable plasmapheresis filtration cartridges which is very low in cost, is sufficiently wear-resistant to be used to help filter a desired amount of whole blood without failing, can be sterilized, and is constructed from components which can be manufactured using high-speed, accurate operations requiring only lot inspections.

Some of the significant advantageous differences between the pivot bearing of the present invention and prior art pivot bearings include:

a pivot pin molded with a special recess which facilitates unrestricted fluid flow while retaining the lubricious properties of a specially compounded plastic.

a stainless steel eyelet, deep drawn from successive dies, employed as an element crucial to the heat dissipation and low coefficient of friction properties needed for disposable plasmapheresis filtration cartridge applications.

a silicon elastomer seal ring, with its superior processing, biocompatibility, and cost, has proven significantly advantageous over other carbon-based elastomers for use in the bearing/seal of the present invention.

The present invention provides a combined floating pivot bearing and seal rotatably supporting a body having a bore which is to be fluid coupled to a stationary pivot pin structure. The pivot pin has an end with an axial recess and a sharp inside edge (e.g., approximately 90° in cross-section) surrounding the recess. The pin is, in turn, adapted for insertion into the bore of the rotatable body. A rigid, metallic, cylindrical shank terminates at one end in an outwardly-extending flange, the shank and the flange meeting at a curved external surface. The shank is rotatably disposed within the pin's axial recess with its outer curved surface rotatably contacting the sharp inside recess edge.

An annular seal disposed between the flange and the body interior surface couples the flange to rotate with the body (e.g., relative to the pin)—and also axially loads the flange by transmitting force exerted by the body. When the flange rotates (e.g., relative to the pin), the sharp inside edge of the recess is quickly burnished by the axially loaded contacting curved flange surface, self-forming an air and fluid-tight seal between the hard flange and the soft end of the pin during the first few rotations.

The shank and flange may be parts of a conventional deep drawn stainless steel eyelet. Such eyelets can be manufactured in large quantities at fairly low cost, and also provide curved surfaces on the undersides of their flanges which just happen to be inherently formed so as to be within a very small range of tolerances. That is, a very large percentage of eyelets from a given lot of eyelets will have a formed radius which is very close to a nominal or expected value (as determined by the dimensions of the final deep drawing form die used to form the eyelets). Such eyelets need no preparation (other than cleaning) to be used in accordance with the present invention.

Although the pivot bearing provided by the present invention is useful wherever an inexpensive, disposable seal is desired, the bearing provides features which are especially advantageous in biological fluid separation devices such as disposable filtration cartridges of continuous-flow plasmapheresis systems. The weight of the rotor of such a cartridge plus the axial load applied by the magnetic drive member rotating the rotor insures adequate force to quickly burnish the seal provided by the present invention into operation and to thereafter maintain the sealing function. The combined bearing/seal is floating, and also self-centering. Moreover, the eyelet provides a significant metallic structure in contact for a significant axial length with a flowing fluid (e.g., the blood component passing through the eyelet shank) for dissipating friction-generated heat caused by rotation of the curved eyelet surface relative to the sharp inside edge — thus minimizing undesirable heat-generated plastic flow (as occurred in some earlier seal systems). Moreover, the bearing provided by the present invention absolutely minimizes rotational seal cross-section contact area which also reduces the amount of heat generated due to friction.

BRIEF DESCRIPTION OF THE DRAWINGS

These and other features and advantages of the present invention will be better and more completely understood by referring to the following detailed description of preferred embodiments in conjunction with the appended sheets of drawings, of which.

DETAILED DESCRIPTION OF PREFERRED EMBODIMENTS

Figures 2, 2A:
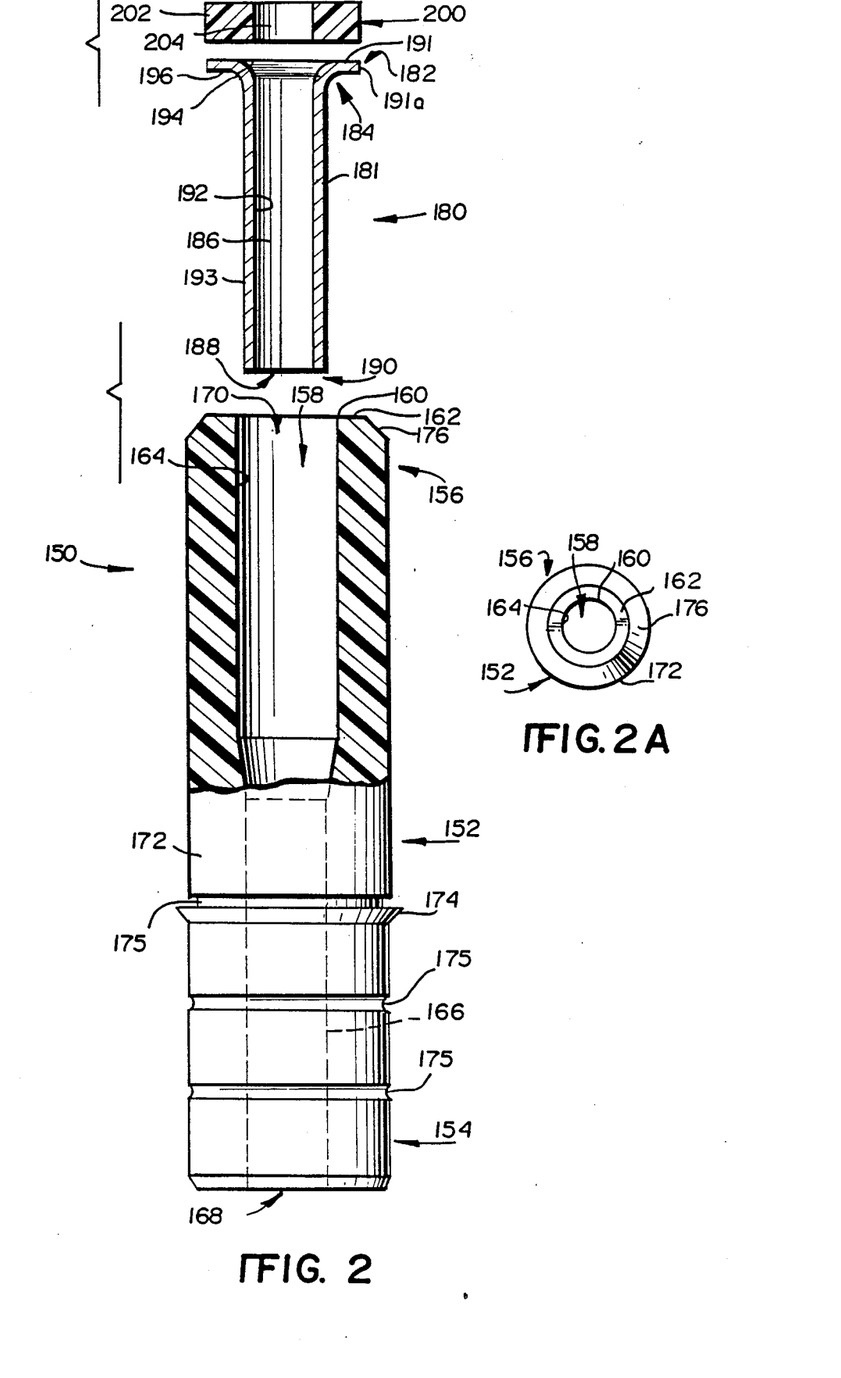
FIG. 2 is an elevated, exploded view in partial cross-section of the presently preferred exemplary embodiment of the pivot bearing/seal provided by the present invention.
FIG. 2(A) is a top view in plan of the recessed end of the pin shown in FIG. 2.

FIG. 2 is an exploded, elevated view in partial cross-section of the components of a presently preferred exemplary embodiment of a pivot bearing 150 in accordance with the present invention. Pivot bearing 150 includes three components: a pin 152, an eyelet 180, and a seal ring 200.

Pin 152 may be an injection-molded elongated plastic pin having a lower ("first") end 154 (assuming the pin is oriented vertically as shown in FIG. 2) and an upper ("further") end 156. An axial recess 158 is defined by the pin at its upper end 156. Axial recess 158 is surrounded by a sharp, circular inner edge 160 and a circular rim 162 (see FIG. 2(A)).

Axial recess 158 in the preferred embodiment is cylindrical and communicates with a passageway 166 extending axially through pin 152 and terminating at pin lower end 154 in an orifice 168. Pin 152 is hollow, and permits fluid to freely flow between the axial recess opening 170 and orifice 168.

The pin exterior wall 172 may be cylindrical and may define circumferential grooves 175 therein. The outside diameter of pin 152 should be precisely controlled so that it is just very slightly larger than the inside diameter of bore 50 defined by lower cartridge housing cap 48 shown in FIG. 1 to provide a tight fit.

Pin 152 is preferably injection-molded (using conventional techniques) from a blend of polyethersulfone (PES) and teflon (manufactured by LNP Corporation, Malvern, Pa., catalog number JL 4010). This material passes all of the constraints outlined below:

A. Passes FDA Class VI toxicity testing;

B. Shows no detrimental effects from Cobal 60 Gamma irradiation of 2.5 to 3.5 Mrad dosage;

C. Has sufficiently low coefficient of friction to show acceptable wear characteristics; and D. Has superior processing (molding) characteristics.

Pin rim 162 could make a perfect right (90°) angle in cross-section with a recess inner wall 164 to form a very sharp edge 160. However, it may not be practical to form a perfect 90° edge on an injection molded pin (since a mold cannot be ground to have a perfect 90° female shape, and a mold cannot be pressurized sufficiently to form a perfect 90° molded edge). In practice, an edge radius R of 0.003 inches to 0.005 inches is the best that can be expected for everyday molding. In the preferred embodiment, this radius is held to a maximum of 0.005 inches.

Pin upper end 156 can be slightly tapered (also as described in that copending patent application) to form a secondary, outer annular rim 176 surrounding annular rim 162. The purpose of this taper is to prevent a ridge of plastic from forming at the upper end of rotor recess 62 due to the action of rotor 18 spinning around the pin (the pin is not always installed perfectly aligned with the axis 19 of rotor rotation).

Figure 5:
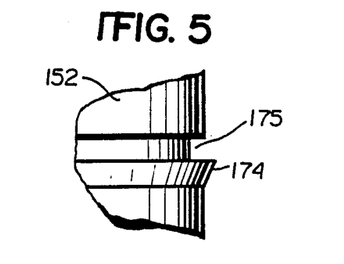
FIG. 5 is a detailed partial view in perspective of deformable sealing lip 174 of pin 152 shown in FIGS. 2 and 3 prior to insertion of the pin into the housing bore.

Pin 152 includes a deformable sealing lip 174 (as can best be seen in FIGS. 2 and 5) which is molded as an integral part of the pin. When molding pin 152, a parting line (not show) is naturally formed lengthwise on the lower portion of the pin near end 154. The upper portion of pin 152 (near pin end 156) has no part line, since it is forcibly pulled from a no-draft section of the mold used to make the pin. Grooves 175 provide a mechanical grip for pulling pin 152 from the no-draft section of the mold. Deformable sealing lip 174 acts as a plastic "O-ring", as will be explained shortly.

Eyelet 180 may be a conventional stainless steel eyelet deep drawn using a successive deep draw type die from 305 stainless steel. As can be best seen in FIGS. 2, 2(B) and 2(C), eyelet 180 is a generally cylindrical, hollow (tubular) metallic member having a cylindrical shank 181 defining a laterally outwardly-extending flange 182 at a terminal (upper) end 184. Eyelet 180 is hollow — a passageway 186 axial to the longer dimension of the eyelet runs the length of the eyelet. Passageway 186 terminates in flange 182 at the upper eyelet end 184 and terminates in a circular orifice 188 at the eyelet lower end 190. An inner eyelet wall 192 bounds passageway 186.

Figure 2B:
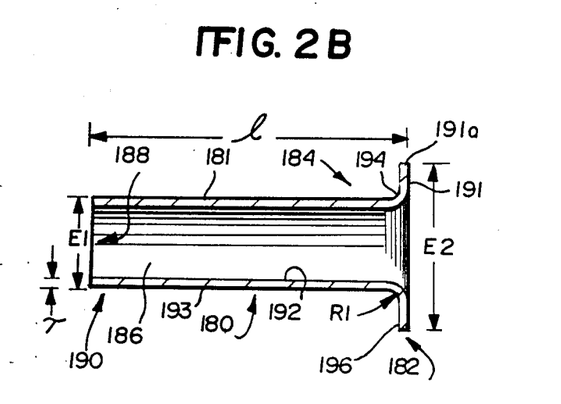
FIG. 2(B) is a side view in cross-section of the eyelet shown in FIG. 2.
Figure 2C:
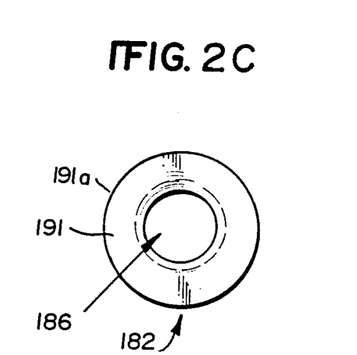
FIG. 2(C) is a top view in plan of the eyelet shown in FIG. 2.

Flange 182 curves laterally radially outwardly from eyelet shank 181 (much as the bell of a brass musical instrument curves radially outwardly from the tube it is connected to). Flange 182 has an upper lateral surface 191 which is approximately perpendicular to an intersecting line defined by the cross-section of shank outer wall 193. Upper lateral surface 191 is an extension of inner wall 192 within shank 181. Lateral surface 191 terminates in a cylindrical peripheral lip 191a at the portion of the flange 182 most distant from shank 181.

A radially curved outer surface —"contacting surface"—194 (which is an extension of outer wall 193 of shank 181) is defined at the junction between shank 181 and flange 182 (actually where outer wall 193 of the shank joins an underside lateral surface 196 of the flange).

The thickness T of the walls of eyelet 180 (included flange 182) is preferably between 0.0045 inches and 0.0055 inches (as can be seen in FIG. 2B). The curved outer contacting surface 194 of eyelet 180 (i.e., the radial surface on the underside of flange 182 when the eyelet is oriented vertically with its flange pointing upwardly) is very precise and shiny in the preferred embodiment, and has a controlled surface texture requirement at 4RMS (this is inherently formed from the deep draw process). The dimensions of eyelet 180 are closely controlled so that bearing 150 will wear in the correct locations. In the preferred embodiment, the length 1 of eyelet 180 is between 0.245 and 0.250 inches; the outside diameter $E_1$ of flange 181 is between 0.069 and 0.070 inches; the outside diameter $E_2$ of flange 182 is between 0.123 and 0.126 inches; and the radius $R_1$ of radial contacting surface 194 is between 0.012 and 0.014 inches.

A specific set of parameters describe the combination of pin 152 and eyelet 180. For example, the radius under flange 182 has been specifically engineered. The following constraints are important in choosing the radii of eyelet flange contacting area 194 and pin edge 160. First, pin edge 160 must be as sharp as possible (e.g., it should have the molded radius of 0.003–0.005 inches for a molded pin structure). Second, the inside diameter/outside diameter relationship between eyelet shank 182 and molded pin recess 158 must allow the eyelet shank to rotate freely within the pin recess when the shank is inserted into the recess (this relationship between diameters is largely dependent on where the radii of the shank and the pin contact one another). Third, manufacturing tolerances of the eyelet 180 and the pin recess 185 must be such that any combination does not allow the two components to contact in any surface other than radius to radius at any time during the operation of the pivot seal. Finally, in blood filtration applications, the smallest possible diameter of pin recess 150 and/or eyelet passageway 186 cannot be below a predetermined cross-sectional area X length so as not to restrict flow and cause a back pressure through the filtration system.

Figure 3:
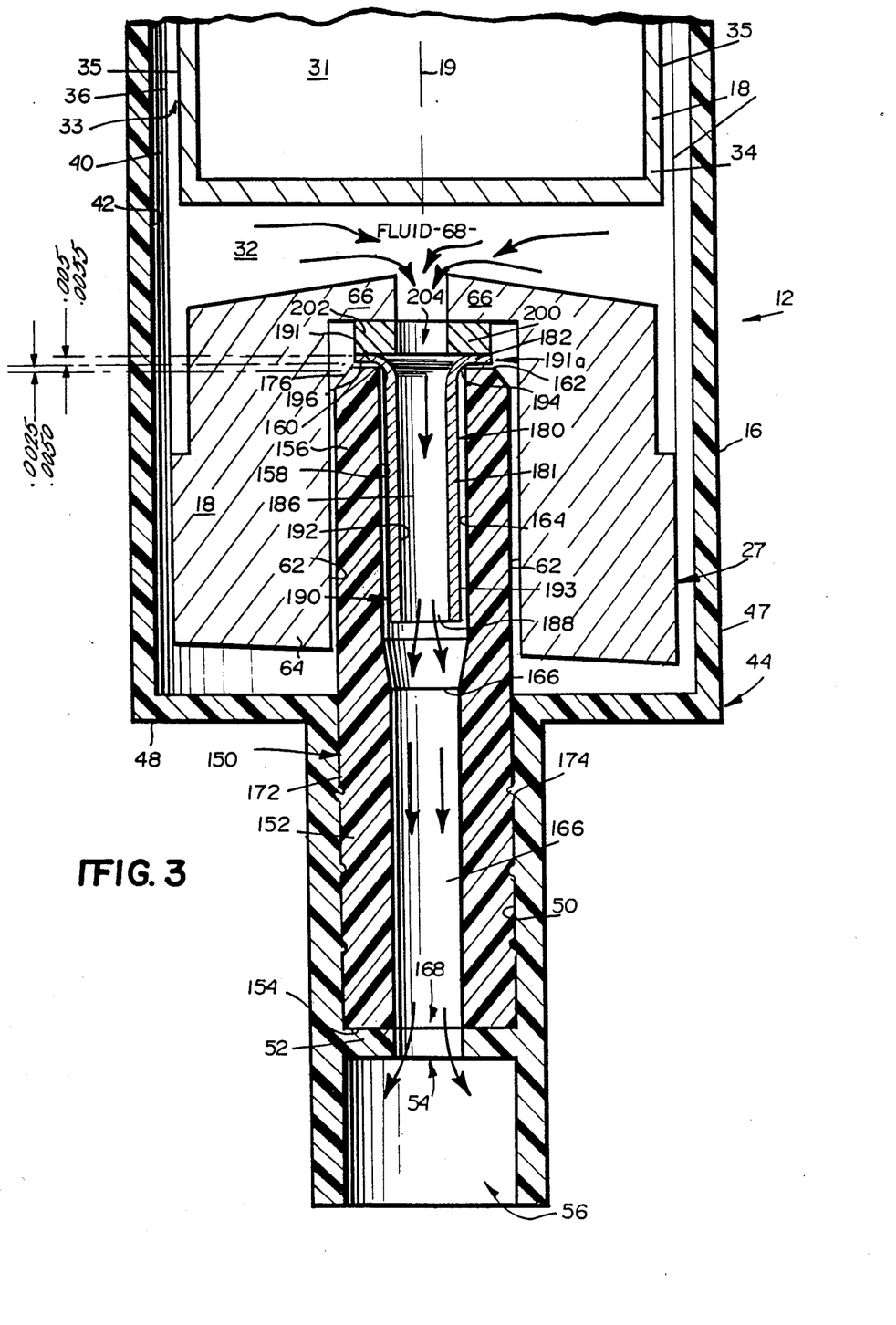
FIG. 3 is a detailed, elevated view in cross-section of the pivot bearing/seal shown in FIG. 2 as installed in a disposable plasmapheresis filtration cartridge of the type shown in FIG. 1.
Figure 4:
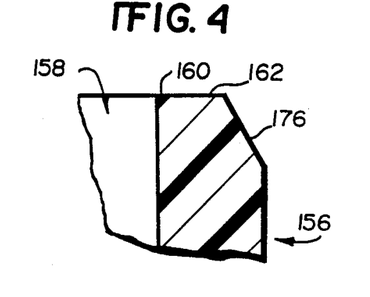
FIG. 4 is a detailed partial view in cross-section of the end of pin 152 shown in FIGS. 2, 2(A) and 3.

As shown in FIG. 3, shank 181 is disposed within pin recess 158 so that the curved outer surface 194 contacts sharp inner edge 160. The weight of shank 181 helps to align the eyelet with passageway 166 (and axial recess 158) and with the axis 19 of rotor rotation, making the pivot bearing/seal of the present invention self-centering. The outside diameter of the shank 181 is smaller than the inside diameter of recess 158 so that the shank rotates freely within the recess (preferably without any contact between shank outer surface 193 and recess inner wall 164).

The only point of contact between pin 152 and eyelet 180 is the sharp inside edge 160 of the pin contacting the flange curved outer surface 194. The outside diameter of eyelet shank 181 is chosen relative to the inside diameter of pin recess 158 so that the curved outer surface 194 contacts sharp inside edge 160 at the point where the radial curved surface 194 is most curved (in the preferred embodiment), making the surface area of pin 152 which contacts eyelet 180 extremely small.

In the preferred embodiment, the spacing between flange underside lateral surface 196 and pin rim 162 is within the range of 0.0025 inches and 0.0050 inches, the rim 162 and the underside lateral surface 196 being substantially parallel to and spaced apart from one another.

Seal ring 200 in the preferred embodiment may be made by extruding medical grade silicon material in a long tube, and slicing off controlled, predetermined thicknesses in a high speed cutting operation. Seal ring 200 forms a compliant silicon annulus 202 having a predetermined thickness. Ring 200 has a passageway 204 through its center. The seal ring outside diameter may be approximately equal to the outside diameter of flange peripheral lip 191a, while the inside diameter of the seal ring may be approximately equal to the inside diameter of eyelet passageway 186.

FIG. 3 is an elevated view in cross-section of the presently preferred exemplary pivot bearing/seal 150 as installed in the disposable cartridge 10 shown in FIG. 1 in lieu of lower precision stainless steel pivot pin 22 and O-ring 72. To assemble pivot bearing 150, pin lower end 154 is first pressed into bore 50 defined by housing lower cap 48 until it abuts annulus 52. Pin 150 in the preferred embodiment does not rotate, but instead is fixed, with respect to housing 16.

Figure 6:
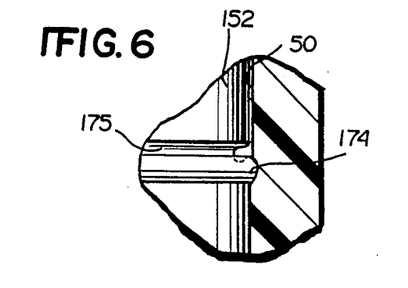
FIG. 6 is a detailed partial view in perspective of deformable sealing lip 174 of pin 152 after the pin is inserted into the housing bore.

When pin 150 is pressed into bore 50, the orifice 168 at the pin lower end 154 is in registry with orifice 54 defined through the center of annulus 52. Deformable pin sealing lip 174 (which is shaped conically and facing away from pin end 154 for easy entry into the bore) deforms and conforms to the wall of the bore (as can best be seen in FIGS. 3 and 6), providing a fluid-tight, one-time seal. The groove (recess) 175 directly adjacent to lip 174 provides space for any excess material to "cold flow" into, preventing housing 48 from being subjected to excessive stress.

Next, seal ring 200 is inserted into rotor bore 62. Eyelet 180 is then slid, flange 182 first, into rotor bore 62 until the flange lateral surface 191 presses ring 200 into contact with the rotor (annulus 66). Finally, pin upper end 156 is inserted into rotor bore 62, and eyelet shank 181 is inserted into axial recess 158 defined in the pin upper end.

Eyelet 180 is loose as installed—that is, there is clearance between the outer wall 193 of the eyelet shank 181 and the pin recess wall 164. As mentioned previously, eyelet 180 is freely rotatable within axial recess 158. The pivot bearing is self-aligning and self-centering upon rotation due to the length of eyelet shank 181 disposed within pin recess 158. Seal ring 200 rests between the upper lateral surface 191 of flange 182 and annulus 66, and provides compliance and a positive seal between flange 182 and rotor 18.

During operation of cartridge 12, rotor 18 rotates at a nominal angular velocity of 3600 rpm with respect to housing 16 in response to the rotating magnetic field produced by magnetic driving assembly 14. Rotor 18 exerts two components of downward force onto seal ring 200. The first component is the weight of rotor 18, and the second component is a downward force generated by the interaction of rotor magnetic ring 24 with the rotating magnetic field produced by magnetic driving assembly 14. These two forces add up to about 380 grams (plus or minus about 40 grams) in the preferred embodiment.

This downward force causes seal ring 200 to rotate together with rotor 18, and also causes eyelet 180 to rotate together with the seal ring—the friction between rotor annulus 66, seal ring 200 and flange upper lateral surface 191 is sufficient to prevent relative rotation of these three parts. The only point of contact between stationary and rotating parts in the lower end of cartridge 12 becomes the sharp edge 160 of pin 152 and the smooth radius of the curved outer surface 194 of eyelet 180.

As the rotor begins to turn up to speed, curved surface 194 burnishes against sharp edge 160 of pin 152 (the pin in the preferred embodiment is softer than the hard stainless steel eyelet 180). Sharp edge 160 takes on the radius of eyelet 180 after a brief run in (tests indicated that substantially all burnishing occurs within the first 10 seconds of relative rotation). This interface between sharp edge 160 and curved surface 194 thus quickly becomes continuous to form an air/liquid tight seal. Because eyelet 180 is axially loaded (axial downward force is applied by rotor 18 to eyelet 180 through seal ring 200), the fluid-tight seal between curved outer surface 194 and sharp edge 160 (now rounded) is maintained as the rotor, seal ring and eyelet continue to rotate relative to pin 152 and housing 16. Tests showed that a downward force of as little as 50 grams is enough to form and maintain the seal.

Self-formation of a proper seal between curved outer surface 194 and sharp edge 160 by burnishing provides many advantages over other seal structures. For example, this burnishing operation forms an air/liquid-tight seal directly between two separately manufactured, loosely coupled components (the eyelet and the pin) without requiring an additional component to be placed therebetween. Moreover, some manufacturing imperfections (e.g., molding flash, dust, and the like) can be overcome by the run-in/burnishing operation of the present invention.

Referring once again to FIG. 1, discharge outlets 56 and 46 and inlet 30 usually are open to the air prior to use of cartridge 12. The space between pin 152 and the wall of rotor bore 62 is ordinarily occupied by air when rotor 18 begins spinning. In blood filtration, blood does not reach the bottom of housing 16 until several seconds after rotor 18 begins spinning. A seal is thus usually self-formed between sharp edge 160 and eyelet flange 182 before fluid has a chance to flow into the space between pin 152 and the wall of rotor bore 62—causing air to become trapped in that space. This air buffer zone behind the fluid contact surface prevents packed red blood cells from mixing with the plasma flowing through the center of eyelet 180 should the seal between contacting surface 194 and sharp edge 160 fail momentarily. Air remains trapped in this space, as the self-formed seal between the eyelet and the pin is air-tight as well as liquid-tight. Moreover, the direct contact rotational surfaces are isolated away from the fluid path because of the trapped air.

In the preferred embodiment, an extremely small quantity of silicon oil (e.g., Dow Corning ® 360 medical grade "polydimethysiloxane" fluid) is applied to pin exterior wall 172 to prevent the wall of rotor bore 62 from galling and depositing material onto pin 152. The amount of silicon oil applied is minute — on the order of 0.1 to 0.5 microliters. Although it is not readily apparent from testing that silicon oil is necessary (for example, it does not appear that any silicon oil needs to be applied to the surfaces of pin 152 contacting eyelet 180), galling of the wall of rotor bore 62 is significantly reduced and/or eliminated when silicon oil is applied.

Application of silicon oil to the pin is an additional step which slightly increases the cost of producing the pivot bearing/seal. There are ways to mold silicon into plastic (and thus avoid this additional step). For example, LNP Corporation provides alloys with discrete addition of silicon (i.e., small pockets of fluid are interspersed within the plastic). Petrarch Systems, Inc. provides an "interpenetrating polymer network" ("IPN") wherein silicon actually bonds on a molecular level with the thermoplastic resin. These materials might be used instead of a plastic compound requiring the application of silicon after molding.

In choosing the particular plastic material to make pin 152 from, we call on our knowledge of plastics and tribology (the science of understanding wear). Past experience and testing demonstrates that plastics with inherently low coefficients of friction are likely candidates. Unfortunately, many such candidates cannot be used in blood filtration cartridge applications because they cannot meet stringent FDA toxicity requirements (although they might well be suitable for use outside of biomedical applications).

Blood filtration cartridges are typically irradiated by gamma radiation in order to sterilize them. Gamma radiation may degrade the characteristics of materials which would otherwise be suitable for fabricating pin 152. For instance, virgin teflon has an extremely low coefficient of friction, but unfortunately, degrades rapidly upon exposure to gamma radiation. Teflon alloyed into other plastics in small amounts (ranging typically from 3-15% by volume) does not seem to affect the base resin engineering properties, and yet may lower the coefficients of friction of select resins. Other plastics, such as Ultra-High-Molecular-Weight polyethylene, have inherently low coefficients of friction which may be suitable.

Another restraint in selecting the material for pin 152 is processibility. Pin 152 is a relatively small part in the preferred embodiment, and yet must be molded to very high tolerances. If the resin cannot flow or demonstrates signs of shear-fracture due to mold configuration, it will not fill the mold properly. Problems such as "cold flow", "weld lines" at the seal interface, or melt fracture are not uncommon. One plastic that was tested and found unsuitable for use in blood filtration cartridge applications for these reasons was a blend of polyetherimide and teflon. Other plastics, such as polyetheretherketone were found to process and perform satisfactorily — but the resin cost of this plastic is ⅔ higher than that of the preferred resin described previously.

Thus, the particular material from which pin 152 is made depends upon how the pivot bearing/seal is to be used. Nominally, the material should have a sufficiently low coefficient of friction to show acceptable wear characteristics, and also have superior processing (molding) characteristics. Pins which are to be used in biomedical applications (e.g., blood filtration cartridges) should also pass FDA Class VI toxicity testing and show no detrimental effects when exposed to a sterilizing dose of gamma radiation.

One important advantage of the sealing/pivot bearing structure provided by the present invention is its ability to dissipate heat generated by the friction between the relative rotating parts. In many prior seal designs, friction becomes an overpowering factor which causes early destruction of the seal. Plastic pivot pins may deform and melt under the heat generated by contact with a rotating rotor, disintegrating any fluid-tight seal between the pin and the rotor and/or closing a fluid passage between the rotor and the pin after only a few minutes of rotation.

The pivot bearing provided by the present invention, on the other hand, uses fluid flow through eyelet passageway 186 to dissipate heat generated by frictional contact of curved surface 194 with sharp edge 160. Eyelet 180, being made of stainless steel (or other heat-conducting material), acts as an integral heat exchanger as it conducts heat away from curved surface 194. Because eyelet 180 is in contact for significant portions of its axial length with a flowing fluid (i.e., plasma flowing from cavity 32 through eyelet passageway 186 and into plasma outlet 56), it quickly dissipates the heat generated by frictional contact between curved surface 194 and sharp edge 160 and prevents undesirable plastic flow of edge 160 or other portions of pin upper end 156. The aspect ratio between the inside diameter of eyelet 180 and the length of the eyelet is high, and is chosen, at least in part, to provide sufficient heat dissipation.

Moreover, relatively little heat is generated by contact between curved flange surface 194 and sharp edge 160 because the rotational seal cross-sectional contact area is absolutely minimized by bringing the radius of the seal to its minimum—that is, the diameter of sharp edge 160 is equal to the diameter of pin recess inner wall 164. There is only a very small contact area between sharp edge 160 and the smooth radius of curved contacting flange surface 194 because the sharp edge has a very small cross-sectional area and contacts the flange at the point where it is the most curved. While a minimal contact surface area is generally desirable, it appears that certain variables could be altered (e.g., load and velocity) with some proportional change to contact surface area.

As mentioned above, fluid flowing through the pivot seal 150 (i.e., through the eyelet passageway 186 and through the pin passageway 166) helps to conduct heat away from the seal area and thus prolongs the life of the seal. Dry runs conducted with no fluid flowing through the pivot seal 15 (a worst case wherein no fluid cooling of the seal area occurs) have shown that friction and heat generation at the seal have been reduced to their lowest possible values. The embodiment shown in FIG. 3 has been tested "dry" for periods typically expected in use. Although this is a gross exaggeration of actual working parameters, it shows that the seal provided by the present invention can be run dry for significant periods of time (such as might occur during a start-up period before fluid contacts the seal area).

The components of the seal 150 of the present invention can be irradiated with gamma radiation after installation to sterilize them. Irradiation of pin 152 may actually harden the plastic pin, reducing wear of edge 160 (but not so much as to prevent the edge from being easily burnished by the eyelet).

A further important advantage of the pivot bearing provided by the present invention is that it is relatively inexpensive to manufacture. In some previous designs, the labor costs associated with manual inspection of the bearing parts needed for quality control substantially increased the cost of disposable cartridge 12.

For example, O-rings 72 for use in the prior art precision steel pin bearing arrangement shown in FIG. 1 must be 100% microscopically inspected (i.e., each and every O-ring must be inspected manually under a microscope), yielding an approximately 40% defect rate due to the inherent problems of compression molding such a small ring. Each acceptable O-ring must then be cleaned and lubricated.

The precision stainless steel pivot pin 22 shown in FIG. 1 is made from a welded, drawn and annealed tube of stainless steel. Twelve-foot lengths of tube are centerless ground and turned to length on an automatic screw machine. The turning process also forms the chamfer and the locating grooves. The turned pins are then batch inspected. Next, each and every pin must be ring gauged individually for outside diameter compliance. Each pin is then hand polished in a jeweler's lathe, each pin requiring a 30 second polishing, an abrasive purge (by plunging a pipe cleaner through its inside diameter), an ultrasonic degreasing, and finally, a lubrication.

The cost of producing the bearing provided by the present invention is substantially less than the cost of producing prior art pivot bearings, since the three processes used to manufacture the components of the pivot bearing of the present invention (i.e., injection molding of pin 152, deep drawing of eyelet 180, and extruding and cutting of seal ring 200) are each high-speed, accurate operations requiring only lot inspection (not 100% inspection).

Very significant cost savings are thus provided by the pivot bearing of the present invention. Assuming X is the cost of each loose eyelet 180, Z is the cost of manufacturing a prior art pivot bearing of the type shown in FIG. 1, and $\Delta\%$ is the cost savings realized by using the pivot bearing of the present invention instead of the prior art pivot bearing, the cost savings of the present invention is given by the following equation:

$$\Delta\% = \frac{X - Z}{Z} \times 100$$

(where the given values X and Z include inspection, labor and cleaning costs, as well as manufacturing costs, so that the equation above expresses cost savings for installed bearings). By substituting approximate cost values into the equation, $\Delta\%$ equals approximately 760%. In simpler terms, the pivot bearing provided by the present invention is only about 1/10th as expensive to manufacture and install as is the precision stainless steel pivot bearing of the type shown in FIG. 1.

The pivot bearing/seal of the present invention takes advantage of the lubricious attributes of an injection-molded plastic pin and the abrasion resistance of a stainless steel eyelet. In developing the pivot bearing of the preferred embodiment, an alternate "tight eyelet" configuration was experimented with. In this alternative configuration, eyelet 180 was pressed into the wear end (upper end 156) of plastic pin 152 and did not rotate relative to the pin (instead, the rotor 18 and seal ring 200 rotated relative to the pin and eyelet). Although this configuration works sufficiently well (and might be very suitable for some applications), it has the drawback that the lateral eyelet surface 191 must be polished to reduce effective wear of seal ring 200. This extra polishing step increases the cost of the pivot bearing.

However, sampled "off-the-shelf" eyelets of the type available from a number of sources, when examined under the microscope, can be seen to have a radius on the underside of flange 182 (i.e., curved surface 194) which is very precise and shiny. This precise, shiny surface is the direct result of the deep drawing die process used to manufacture such eyelets. By applying modest pressure to an eyelet inserted in a recess molded into the end of a plastic pin, it can be seen under the microscope that the curved outer surface 196 under flange 182 burnishes the plastic inside edge of the pin when the eyelet is rotated relative to the pin. Even crude models constructed using eyelets of non-optimum size and shape proved that a seal will self-form between the edge of the pin recess and the radius under the flange in a rotating manner.

A 20X engineering study was performed to see what kind of tolerances could be expected and how these tolerances would affect seal reliability. This study demonstrated that pin 152, eyelet 180 and seal ring 200 could be manufactured to standard specifications in the three respective fields of injection molding, deep drawing and elastomer production. Additional tests have shown that the seal design provided by the present invention is much more forgiving to the axial downward forces imparted on seal ring 200 by rotor 18 because more leeway in manufacturing the critical disposable parts of disposable cartridge 12 is provided (and thus the dimensional tolerances of these parts are less critical).

Figures 7, 9:
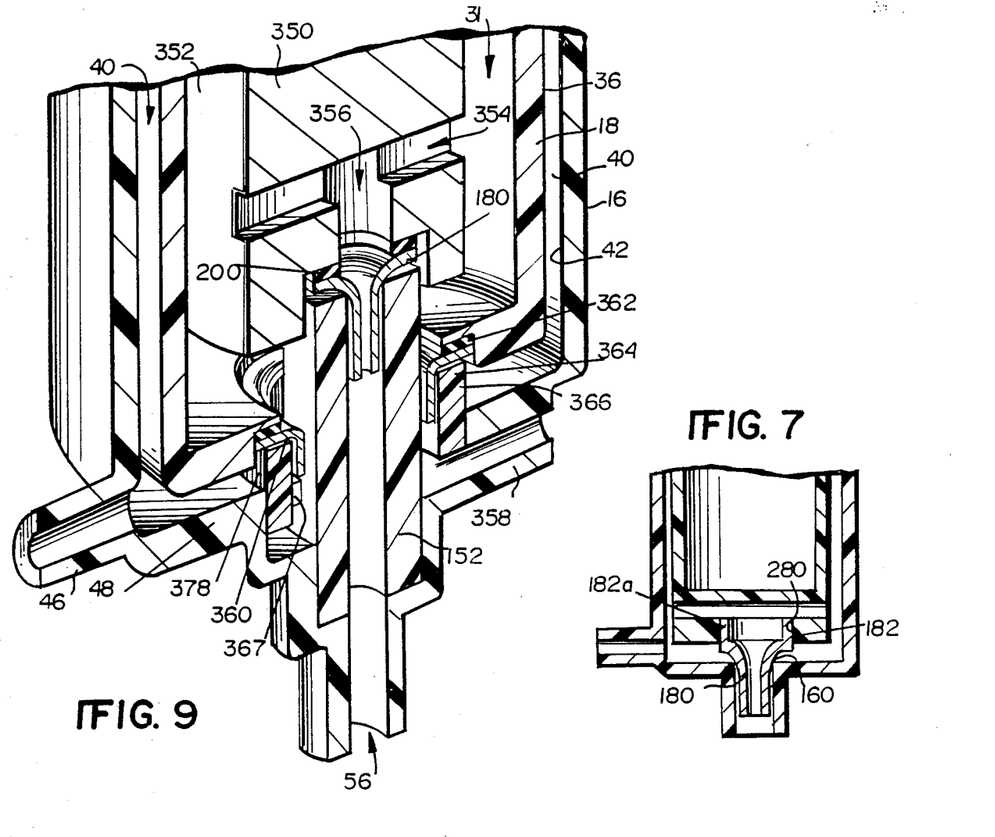
FIG. 7 is an elevated view in cross-section of a further embodiment of a blood filtration cartridge in accordance with the present invention wherein the seal ring and pivot pin are eliminated and a seal is self-formed directly between the cartridge housing and the eyelet.
FIG. 9 is an elevated cross-sectional view in perspective of a further embodiment of a blood filtration cartridge in accordance with the present invention including a coaxial molded pivot seal arrangement providing multiple seals between the rotor and the housing.
Figure 8:
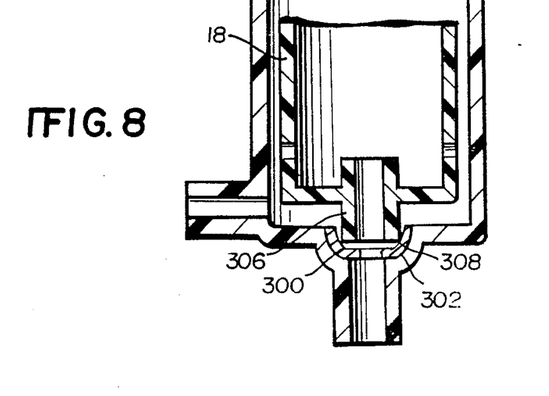
FIG. 8 is an elevated view in cross-section of a further embodiment of a blood filtration cartridge in accordance with the present invention wherein a seal is formed between a pin integral with the rotor and a metal cup disposed in the housing.

FIGS. 7 and 8 show alternate embodiments in accordance with the present invention wherein pin 152 is eliminated as a separate molded entity. FIG. 7 shows an embodiment wherein the sharp circular plastic edge 160 contacting eyelet 180 is molded into plastic housing 16 (which should be made of the same or equivalent material as the plastic used to make pin 152). In the embodiment shown in FIG. 7, eyelet 180 is also modified in shape (i.e., flange 182 is provided with an axially-extending cylindrical portion 182A) to allow the flange to be press-fit into a bore 280 in rotor 180 (thus eliminating the need for a seal ring between the eyelet flange and the rotor).

FIG. 8 shows a further embodiment wherein eyelet 180 is replaced with a stainless steel cup 300 having a large radius and disposed in a cup-shaped depression 302 defined in housing 16. A hollow pin structure 306, molded as part of rotor 18 (and axially extending from the rotor), has a sharp edge 308 on its outside diameter. Sharp edge 308 rotates in contact with the inner radius of cup 300, self-forming a seal at the interface between the two radii.

Figure 10:
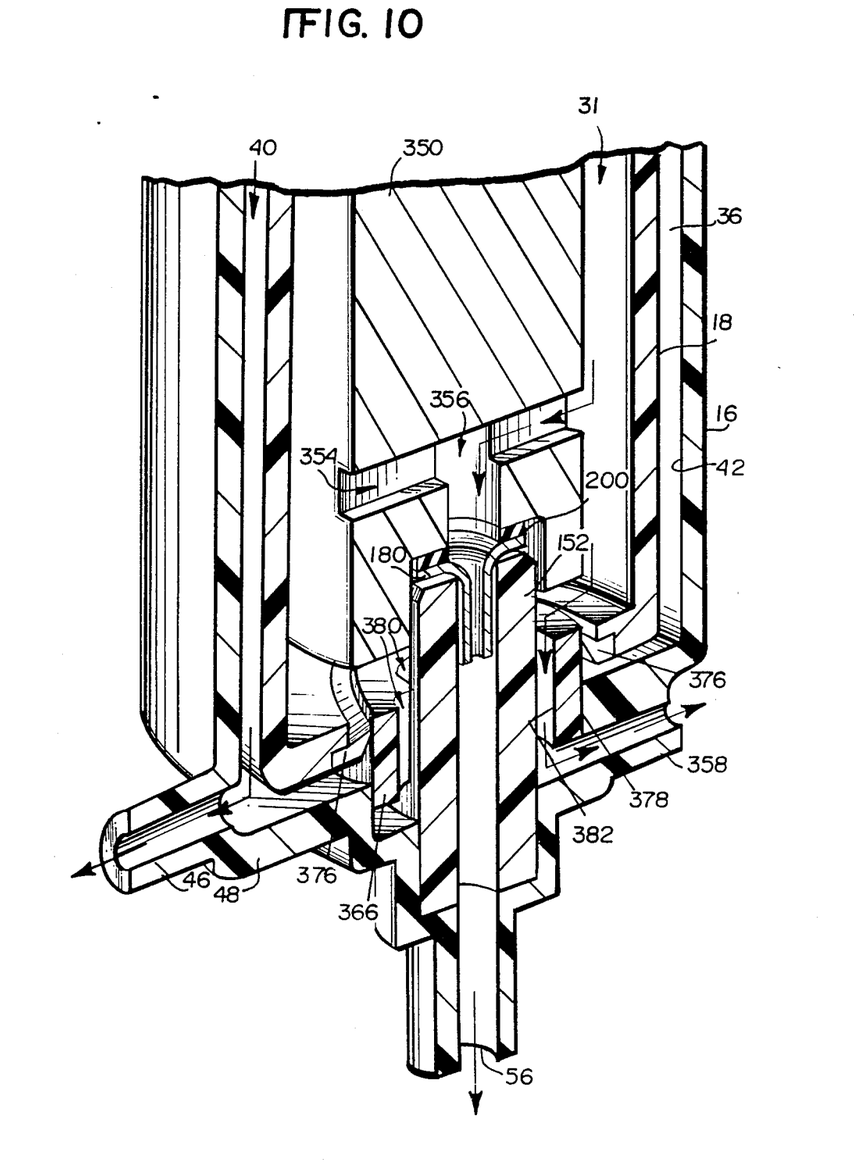
FIG. 10 is an elevated cross-sectional view in perspective of an alternate further embodiment of a blood filtration cartridge of the present invention including a coaxial molded pivot seal arrangement providing multiple seals between the rotor and housing.

Some pivot bearing applications may require dual or multiple sealing. For example, it might be necessary to pass three different liquids between a rotor and respective outlets of a housing while isolating each of the liquids from the other two (it is not uncommon to cascade filters to provide filtrates of different densities and the like). FIGS. 9 and 10 show two different alternate embodiments of a sealing pivot bearing providing dual or multiple sealing and including coaxial seal structures.

In the embodiment shown in FIG. 9, a rotor 18 spins in a first direction and separates a fluid into first and second components. The first fluid component flows through a space 40 between inner wall 42 of the housing 16 and outer rotor wall 34 (or a filter membrane covering this outer wall, and exit the housing through outlet 46. The second fluid component flows into volume 31 defined within the interior of rotor 18.

A further rotor ("counter-rotor") 350 is rotatably disposed within interior volume 31 of rotor 18. Rotor 350 rotates independently of rotor 18 (and may be controlled to rotate at a different speed and/or in a different direction). Rotor 350 further separates the fluid within the interior volume 31 of rotor 18 into third and fourth components.

The third fluid component remains in the space between an outer wall 352 of rotor 350 and an inner wall of rotor 18. The fourth fluid component flows through passageway 354 defined through rotor 350 and into a volume 356 defined within the interior of rotor 350. The third fluid component is exhausted from housing 16 through a further fluid outlet 358, while the fourth fluid component is discharged through axial fluid outlet 56. All three fluid components (i.e., the first, third and fourth components) should not be permitted to mix with one another once they have been separated.

The embodiment shown in FIG. 9 includes pin 152, an eyelet 180 and a seal 200 (having a structure and operation as described in connection with FIGS. 2 and 3) which couple the fourth fluid component within the interior volume 356 of rotor 350 to discharge outlet 56 while rotatably supporting rotor 350. An additional seal is provided between the interior volume 31 of rotor 18 and discharge outlet 358 by a further eyelet 360, a further seal ring 362, and further sharp edge 364 defined in a "pin-like" projecting portion 366 extending from housing lower cap 48. Projecting portion 366 is coaxial with pin 152, and eyelet 360 is coaxial with eyelet 180.

Eyelet 360 has an inside diameter which is greater than the outside diameter of pin 152, and rests on sharp edge 364 defined by projecting portion 366 such that the only contact between housing 16 and eyelet 360 is a radius-to-radius contact. Projecting portion 366 is fitted to housing lower cap 48, and is provided with recessed webs 367 (which do not interfere with the rotation of eyelet 360) to help align the axis of rotations of rotors 18 and 350. Spaces between webs 367 permit fluid to flow between pin 152 and projecting portion 366. Rotor 18 applies axial force to eyelet 360 through seal ring 362 to cause a seal to be self-formed between the radius of the eyelet and the sharp edge 364. As discussed previously, a seal will self-form between eyelet 360 and edge 364 when rotor 18 begins rotating relative to housing 16 and burnishes the sharp edge. This self-formed seal prevents the fluid component present within rotor interior volume 31 from mixing with the first fluid component present within space 40.

As described above, it is important that a proper seal force is applied to eyelet 180 (and eyelet 360) if seals are to be self-formed and maintained. Rotors 18 and 350 should be therefore designed so that proper sealing forces are applied to seal ring 180 and seal ring 362.

FIG. 10 is an alternate embodiment of a sealing pivot bearing including a coaxial sealing arrangement wherein a fluid-tight seal between interior rotor volume 356 and discharge outlet 56 is provided by a pin-/eyelet/seal ring arrangement of the type shown in FIGS. 2 and 3 and a further fluid-tight seal is provided between interior rotor volume 31 and discharge outlet 358 by a conventional lip seal member 376.

In the embodiment shown in FIG. 10, rotor 18 is allowed to float freely on the outer wall 378 of extending portion 366, a seal being established between conventional lip seal member 376 and this outer wall. Lip seal member 376 may be molded as part of rotor 18 (or fabricated separately and press-fitted into a ring-shaped slot defined in the rotor). Lip seal member 376 is self-biased toward projecting portion outer wall 378, and provides a sealing function as rotor 18 rotates and moves axially with respect to housing 16. Webs 380 can run the length of projecting member 366 in this embodiment because there is no rotating eyelet in this outer coaxial seal.

An inexpensive pivot bearing/seal especially useful in disposable biological fluid filtration cartridges has been disclosed. While the present invention has been described with what is presently considered to be the most practical and preferred embodiments, it is to be understood that the appended claims are not to be limited to the disclosed embodiments but, on the contrary, are intended to cover modifications, variations and/or equivalent arrangements which retain any of the novel features and advantages of this invention. By way of non-limiting example, although the seal provided by the present invention is particularly suited for rotatably supporting/sealing a rotor of a disposable plasmapheresis filtration cartridge, it can be used as well in devices which separate fluids other than blood, or anywhere a low cost, disposable seal is needed. Moreover, the vertical orientation of the exemplary embodiment shown in the drawings should not be taken as limiting the invention to applications where a vertically oriented pivot pin is required. Also, the "eyelet" structure used in accordance with the present invention can have a variety of different shapes (the shape shown in FIG. 2(B) or the shape shown in FIG. 7 are two non-limiting examples).

What is claimed is:

1. A pivot bearing for supporting a first body and permitting said first body to rotate relative to a second body, said bearing comprising:
   structure fixed with respect to said second body and defining a recess having an inside edge surrounding said recess,
   an eyelet having a shank with an outwardly-extending flange at one end, the junction of said flange and said shank including a contacting surface, said shank being rotatably disposed within said recess and said contacting surface rotatably contacting said edge; and
   means disposed between said first body and said flange for coupling said flange to rotate with said first body relative to said structure.

2. A pivot bearing as in claim 1 wherein said contacting surface comprises a curved outside surface on the underside of said flange.

3. A pivot bearing as in claim 1 wherein said structure comprises an elongated plastic pin mounted to said second body.

4. A pivot bearing as in claim 1 wherein said structure comprises a material which is much softer than the material said eyelet comprises.

5. A pivot bearing as in claim 1 wherein said contacting surface is smooth.

6. A pivot bearing as in claim 1 further including a seal formed between said contacting surface and said inside edge by rotating said surface with respect to said inside edge so as to burnish at least one of said surface and said edge.

7. A pivot bearing as in claim 1 wherein:
   said structure inside edge defines a first circular radius;
   said eyelet contacting surface defines a second circular radius; and
   the only areas of contact between said structure and said eyelet comprise said first and second radii.

8. A pivot bearing as in claim 1 wherein said eyelet centers itself with respect to said structure recess upon rotation of said eyelet relative to said structure.

9. A pivot bearing as in claim 1 wherein said coupling means includes means for axially loading said flange.

10. A pivot bearing as in claim 1 wherein
    said eyelet defines a hollow passage axially therethrough; and
    said coupling means includes means for coupling fluid to flow through said eyelet passage.

11. A pivot bearing as in claim 1 wherein said eyelet comprises a material which transfers heat from said eyelet contacting surface to said fluid.

12. A pivot bearing as in claim 1 wherein said eyelet floats on said inside edge.

13. A pivot bearing as in claim 1 wherein:
    said structure comprises an elongated pin adapted for insertion into a bore defined by said second body, said pin including a deformable, annular seal extending from an exterior cylindrical surface thereof, said annular seal deforming into sealing contact with the wall of said bore when said pin is inserted into said bore.

14. A pivot bearing as in claim 13 wherein said pin outside diameter is larger than the diameter of said bore, and said pin defines an annular slot in said exterior cylindrical surface adjacent said annular seal, said slot providing a space which excess portions of said annular seal may occupy when said pin is inserted into said bore.

15. A pivot bearing as in claim 13 wherein said annular seal is molded integral with said pin.

16. A pivot bearing as in claim 13 wherein said annular seal includes a conical lip portion terminating in a circular rim, said rim being insert into said bore before said conical portion.

17. A bearing/seal for supporting a first body and permitting said first body to rotate relative to a second body, said baring/seal comprising:
    first structure coupled to said first body and having a surface defining a concave circular radial surface area, said first structure including for means defining a first fluid passage;
    second structure coupled to said second body and having a surface defining a sharp circular edge, said second structure including means for defining a second fluid passage;
    means, coupled to one of said first and second bodies, for biasing said first structure radial surface area into floating contact with said second structure sharp circular edge such that the only contact between said first and second structures is said first structure radial surface area contacting said second structure sharp circular edge, for coupling said first and second fluid passages together, and for rotating said first structure relative to said second structure; and
    means included at said first structure concave radial surface area for burnishing said sharp circular edge to form a fluid-tight seal between said first structure radial surface area and said second structure sharp edge in response to relative rotation of said first and second structures, said seal preventing fluid from leaking into or out of said first and second passages at the contact between said first and second structures.

18. A floating bearing/seal for supporting a first body and permitting said first body to rotate relative to a second body, said bearing/seal comprising:
    structure fixed with respect to said second body and defining a recess having an inside edge surrounding said recess;
    a cylindrical member having an outwardly-extending flange at one end, said flange defining an external radial surface area, said member being disposed in said recess with said radial surface area floating in contact with said inside edge; and
    means disposed between said first body and said flange for biasing said flange toward said edge and causing said flange to rotate with respect to said structure.

19. A bearing/seal as in claim 18 wherein:
    said structure inside edge defines a radial surface area;
    the only areas of contact between said structure and said cylindrical member comprise said structure radial surface area and said flange radial surface area.

20. A bearing/seal as in claim 18 wherein said member centers itself with respect to said recess upon rotation of said member relative to said structure.

21. A bearing/seal as in claim 18 wherein:
    said cylindrical member is hollow;
    said biasing means includes means for coupling a fluid flow through said hollow member;

said member comprises a material which transfers heat from said radial surface area to said fluid flowing through said member; and said fluid flow is isolated from said member radial surface area and structure edge.

22. A bearing/seal as in claim 18 wherein said structure comprises a material which is softer than the material comprising said member.

23. A bearing/seal as in claim 18 further comprising an air and fluid tight seal formed between said flange radial surface area and said edge upon rotation of said member relative to said structure under axial loading applied to said flange by said biasing means.

24. A bearing/seal as in claim 18 wherein:
said first body is cylindrical; and
said biasing means supports said first body such that said first body is concentric with said recess.

25. A bearing/seal as in claim 18 further including means for creating an air buffer zone surrounding said member external radial surface area and structure edge.

26. A bearing/seal as in claim 18 further including:
further structure fixed with respect to said second body and defining a further recess concentric with said first-mentioned recess, said first-mentioned structure being disposed within said further recess; and
sealing means connected to said first body for establishing a seal between said first body and said further structure.

27. A bearing/seal as in claim 26 wherein said sealing means comprises a lip seal.

28. A bearing/seal as in claim 26 wherein:
said further structure defines a further inside edge surrounding said further recess, said first-mentioned and further edges both being circular and coaxial; and
said sealing means comprises:
an eyelet having a shank with an outwardly-extending flange at one end, the junction of said eyelet flange and said shank including a radial contacting surface, said eyelet shank being rotatably disposed within said further recess and said eyelet radial contacting surface rotatably contacting said further edge; and
means disposed between said first body and said eyelet flange for coupling said eyelet to rotate with said first body relative to said further structure.

29. A pivot bearing for supporting a first body and permitting said first body to rotate relative to a second body, said first body defining a bore therein terminating in an interior surface, said bearing comprising:
an elongated pin mounted to said second body, said pin having an end defining a recess therein, said pin end also defining an edge surrounding said recess, said pin end adapted for insertion into said first body bore;
a rigid, cylindrical shank having an outwardly-extending flange at one end, the junction of said flange and said shank refining a contacting surface, said shank rotatably disposed within said pin recess, said contacting surface rotatably contacting said edge; and
means disposed between said first body interior surface and said flange for coupling said flange to rotate with said first body relative to said pin.

30. An improved pivot bearing of the type including an injection-molded plastic pivot pin having an end rotatably engaging with a bore defined within a body rotating relative to said pin, the improvement comprising:
means defining an axial recess within said pin end surrounded by a sharp circular inside edge;
a metallic eyelet having a shank rotatably disposed within said pin recess, said shank terminating at one end in an outwardly-extending flange, the junction of said flange and said shank defining a curved surface contacting said sharp edge; and
means for coupling said flange to rotate with said body relative to said pin,
wherein said sharp edge burnishes itself upon rotating relative to said eyelet curved surface to self-form a fluid-tight seal between said sharp edge and said contacting surface.

31. A pivot bearing comprising:
a body including means having a bore defined therein;
an elongated pin adapted for insertion into said bore, said pin having an exterior cylindrical surface;
annular seal means, projecting from said pin exterior surface, for deforming into sealing contact with the wall of said bore when said pin is inserted into said bore, said annular seal being molded integral with said pin; and
a circular slot defined within said pin adjacent to said annular seal means, said annular seal means also for deforming at least a portion thereof into said slot upon insertion of said pin into said bore.

32. A pivot bearing as in claim 31 wherein said pin outside diameter is larger than the diameter of said bore, and said pin defines an annular slot on said exterior cylindrical surface adjacent said annular seal means, said slot providing a space which excess portions of said annular seal means may occupy when said pin is inserted into said bore.

33. A pivot bearing as in claim 31 wherein said annular seal means includes a conical lip portion terminating in a circular rim, said rim being insert into said bore before said conical portion.

34. A pivot bearing as in claim 33 wherein said pin has an annular slot defined in said exterior surface adjacent said rim.

35. A pivot bearing as in claim 31 wherein said pin has a fluid passage defined axially therethrough.

36. A pivot bearing structure disposed between two bodies so as to permit them to rotate relative to one another while simultaneously permitting fluid flow therethrough, said bearing structure comprising:
first cylindrical structure having a fluid flow bore therethrough with a relatively sharp-edged circular contacting surface disposed thereabout, said first structure being associated with a first one of said bodies; and
a flanged second structure having a concave curved contacting surface disposed around a fluid flow bore, said flanged second structure being associated with a second one of said bodies and said fluid-flow bores being in fluid communication, said concave curved contacting surface being in rotatable contact with said sharp-edged circular contacting surface and including means for burnishing said sharp-edged circular contacting surface to form a fluid-tight seal between said concave curved contacting surface and said sharp-edged circular contacting surface in response to relative rotational motion between said concave curved contacting surface and said sharp-edged circular contacting surface.

* * * * *